United States Patent
Chen et al.

(10) Patent No.: US 12,541,935 B2
(45) Date of Patent: Feb. 3, 2026

(54) METHODS, APPARATUS AND SYSTEMS INCORPORATING GANS MINIMIZING ATTRIBUTE ENTANGLEMENT USING SELF-CORRECTED GANS SPACES

(71) Applicant: L'Oréal, Paris (FR)

(72) Inventors: Zikun Chen, Toronto (CA); Ruowei Jiang, Toronto (CA)

(73) Assignee: L'Oréal, Paris (FR)

( * ) Notice: Subject to any disclaimer, the term of this patent is extended or adjusted under 35 U.S.C. 154(b) by 115 days.

(21) Appl. No.: 18/477,860

(22) Filed: Sep. 29, 2023

(65) Prior Publication Data
US 2025/0111630 A1   Apr. 3, 2025

(51) Int. Cl.
G06T 19/20   (2011.01)
(52) U.S. Cl.
CPC .......... *G06T 19/20* (2013.01); *G06T 2200/24* (2013.01); *G06T 2219/2024* (2013.01)
(58) Field of Classification Search
CPC ................. G06T 19/20; G06T 2200/24; G06T 2219/2024
See application file for complete search history.

(56) References Cited

PUBLICATIONS

Kazemi et al. "Style and content disentanglement in generative adversarial networks." 2019 IEEE Winter Conference on Applications of Computer Vision (WACV). IEEE, 2019. (Year: 2019).*
Liu et al. "Self-conditioned generative adversarial networks for image editing." arXiv preprint arXiv:2202.04040 (2022). (Year: 2022).*
"SC2GAN: Rethinking Entanglement by Self-correcting the Correlated GAN Space", ICCV 2023 Submission #10977, Apr. 4, 2023, pp. 1-10.
Rameen Abdal, Yipeng Qin, and Peter Wonka. Image2stylegan: How to embed images into the stylegan latent space? In Proceedings of the IEEE/CVF International Conference on Computer Vision, pp. 4432-4441, 2019.

(Continued)

*Primary Examiner* — Daniel F Hajnik
*Assistant Examiner* — Jed-Justin Imperial
(74) *Attorney, Agent, or Firm* — Oblon, McClelland, Maier & Neustadt, L.L.P.

(57) ABSTRACT

Methods, apparatus, systems achieve disentanglement in semantic editing using GANs-based models. Self-corrected (low-density) latent code samples are projected in the original latent space and the editing directions corrected though relearning based on resulting high-density and low-density regions in the amended latent space. Leveraging the original meaningful directions and semantic region-specific layers, operations interpolate the original latent codes to generate images with minority combinations of attributes, then inverts these samples back to the original latent space. In accordance with embodiments, the operations can apply to preexisting methods that learn meaningful latent directions. Attribute disentanglement is improved with small amounts of low-density region samples added. Resulting GANs models with disentangled editing directions are useful in a variety of applications including virtual reality applications, virtual try on (VTO) applications or other virtual try out applications that simulate an effect of a product or service, among other applications.

19 Claims, 7 Drawing Sheets

(56) References Cited

PUBLICATIONS

Rameen Abdal, Yipeng Qin, and Peter Wonka. Image2stylegan++: How to edit the embedded images? In Proceedings of the IEEE/CVF conference on computer vision and pattern recognition, pp. 8296-8305, 2020.

David Bau, Jun-Yan Zhu, Hendrik Strobelt, Bolei Zhou, Joshua B. Tenenbaum, William T. Freeman, and Antonio Torralba. Gan dissection: Visualizing and understanding generative adversarial networks. In Proceedings of the International Conference on Learning Representations (ICLR), 2019.

David Bau, Jun-Yan Zhu, Jonas Wulff, William Peebles, Hendrik Strobelt, Bolei Zhou, and Antonio Torralba. Seeing what a gan cannot generate. In Proceedings of the IEEE/CVF International Conference on Computer Vision, pp. 4502-4511, 2019.

Volker Blanz and Thomas Vetter. A morphable model for the synthesis of 3d faces. In Proceedings of the 26th annual conference on Computer graphics and interactive tech-niques, pp. 187-194, 1999.

Andrew Brock, Jeff Donahue, and Karen Simonyan. Large scale GAN training for high fidelity natural image synthesis. In International Conference on Learning Representations, 2019.

Zikun Chen, Ruowei Jiang, Brendan Duke, Han Zhao, and Parham Aarabi. Exploring gradient-based multi-directional controls in gans. In Computer Vision-ECCV 2022: 17th European Conference, Tel Aviv, Israel, Oct. 23-27, 2022, Proceedings. Part XXIII, pp. 104-119. Springer, 2022.

Yu Deng, Jiaolong Yang, Dong Chen, Fang Wen, and Xin Tong. Disentangled and controllable face image generation via 3d imitative-contrastive learning. In Proceedings of the IEEE/CVF conference on computer vision and pattern recognition, pp. 5154-5163, 2020.

Ian Goodfellow, Jean Pouget-Abadie, Mehdi Mirza, Bing Xu, David Warde-Farley, Sherjil Ozair, Aaron Courville, and Yoshua Bengio. Generative adversarial nets. Advances in neural information processing systems, 27, 2014.

Erik Härkönen, Aaron Hertzmann, Jaakko Lehtinen, and Sylvain Paris. Ganspace: Discovering interpretable gan controls. Advances in Neural Information Processing Systems, 33:9841-9850, 2020.

Phillip Isola, Jun-Yan Zhu, Tinghui Zhou, and Alexei A. Efros. Image-to-image translation with conditional adversarial networks. In Proceedings of the IEEE Conference on Computer Vision and Pattern Recognition (CVPR), Jul. 2017.

Tero Karras, Miika Aittala, Samuli Laine, Erik Härkönen, Janne Hellsten, Jaakko Lehtinen, and Timo Alla. Alias-free generative adversarial networks. Advances in Neural Infor-mation Processing Systems, 34:852-863, 2021.

Tero Karras, Samuli Laine, and Timo Aila. A style-based generator architecture for generative adversarial networks. In Proceedings of the IEEE/CVF conference on computer vision and pattern recognition, pp. 4401-4410, 2019.

Tero Karras, Samuli Laine, Miika Aittala, Janne Hellsten, Jaakko Lehtinen, and Timo Aila. Analyzing and improving the image quality of stylegan. In Proceedings of the IEEE/CVF conference on computer vision and pattern recognition, pp. 8110-8119, 2020.

Bowen Li, Xiaojuan Qi, Thomas Lukasiewicz, and Philip Torr. Controllable text-to-image generation. Advances in Neural Information Processing Systems, 32, 2019.

Mehdi Mirza and Simon Osindero. Conditional generative adversarial nets. arXiv preprint arXiv:1411.1784, 2014.

Augustus Odena, Christopher Olah, and Jonathon Shlens. Conditional image synthesis with auxiliary classifier gans. In International conference on machine learning, pp. 2642-2651. PMLR, 2017.

Yujun Shen, Ceyuan Yang, Xiaoou Tang, and Bolei Zhou. Interfacegan: Interpreting the disentangled face representation learned by gans. IEEE transactions on pattern analysis and machine intelligence, 2020.

Ayush Tewari, Mohamed Elgharib, Gaurav Bharaj, Florian Bernard, Hans-Peter Seidel, Patrick Perez, Michael Zollhofer, and Christian Theobalt. Stylerig: Rigging style-gan for 3d control over portrait images. In Proceedings of the IEEE/CVF Conference on Computer Vision and Pattern Recognition, pp. 6142-6151, 2020.

Omer Tov, Yuval Alaluf, Yotam Nitzan, Or Patashnik, and Daniel Cohen-Or. Designing an encoder for stylegan immage manipulation. ACM Transactions on Graphics (TOG), 40(4):1-14, 2021.

Tengfei Wang, Yong Zhang, Yanbo Fan, Jue Wang, and Qifeng Chen. High-fidelity gan inversion for image attribute editing. In Proceedings of the IEEE/CVF Conference on Computer Vision and Pattern Recognition, pp. 11379-11388, 2022.

Zongze Wu, Dani Lischinski, and Eli Shechtman. Stylespace analysis: Disentangled controls for stylegan image genera-tion. In Proceedings of the IEEE/CVF Conference on Com-puter Vision and Pattern Recognition, pp. 12863-12872, 2021.

Han Zhang, Tao Xu, Hongsheng Li, Shaoting Zhang, Xiao-gang Wang, Xiaolei Huang, and Dimitris N Metaxas. Stack-gan: Text to photo-realistic image synthesis with stacked generative adversarial networks. In Proceedings of the IEEE international conference on computer vision, pp. 5907-5915, 2017.

Jun-Yan Zhu, Taesung Park, Phillip Isola, and Alexei A Efros. Unpaired image-to-image translation using cycle-consistent adversarial networks. In Proceedings of the IEEE international conference on computer vision, pp. 2223-2232, 2017.

Peihao Zhu, Rameen Abdal, Yipeng Qin, John Femiani, and Peter Wonka. Improved stylegan embedding: Where are the good latents? arXiv preprint arXiv:2012.09036, 2020.

International Search Report and Written Opinion dated Jan. 17, 2025, issued in PCT/EP2024/076619 (Documents 24-26 being cited therein).

Shi Yichun et al.: "SemanticStyleGAN: Learning Compositional Generative Priors for Controllable Image Synthesis and Editing", 2022 IEEE/CVF Conference on Computer Vision and Pattern Recognition (CVPR), IEEE, Jun. 18, 2022 (Jun. 18, 2022), pp. 11244-11254, XP034196210, DOI: 10.1109/CVPR52688.2022.01097,[retrieved on Sep. 27, 2022].

Liu Hongyu et al.: "Delving StyleGAN Inversion for Image Editing: A Foundation Latent Space Viewpoint", 2023 IEEE/CVF Conference on Computer Vision and Pattern Recognition (CVPR), IEEE, Jun. 17, 2023 (Jun. 17, 2023), pp. 10072-10082, XP034401543,DOI: 10.1109/CVPR52729.2023.00971, [retrieved on Aug. 22, 2023].

Lee Cheng-Han et al.: "MaskGAN: Towards Diverse and Interactive Facial Image Manipulation", 2020 IEEE/CVF Conference on Computer Vision and Pattern Recognition (CVPR), IEEE, Jun. 13, 2020 (Jun. 13, 2020). pp. 5548-5557, XP033803630, DOI: 10.1109/CVPR42600.2020.00659 [retrieved on Aug. 3, 2020].

\* cited by examiner

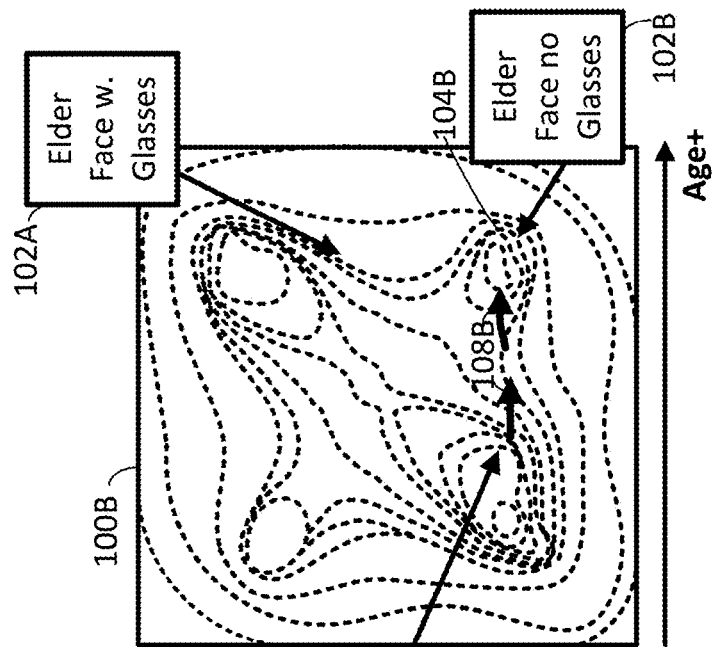
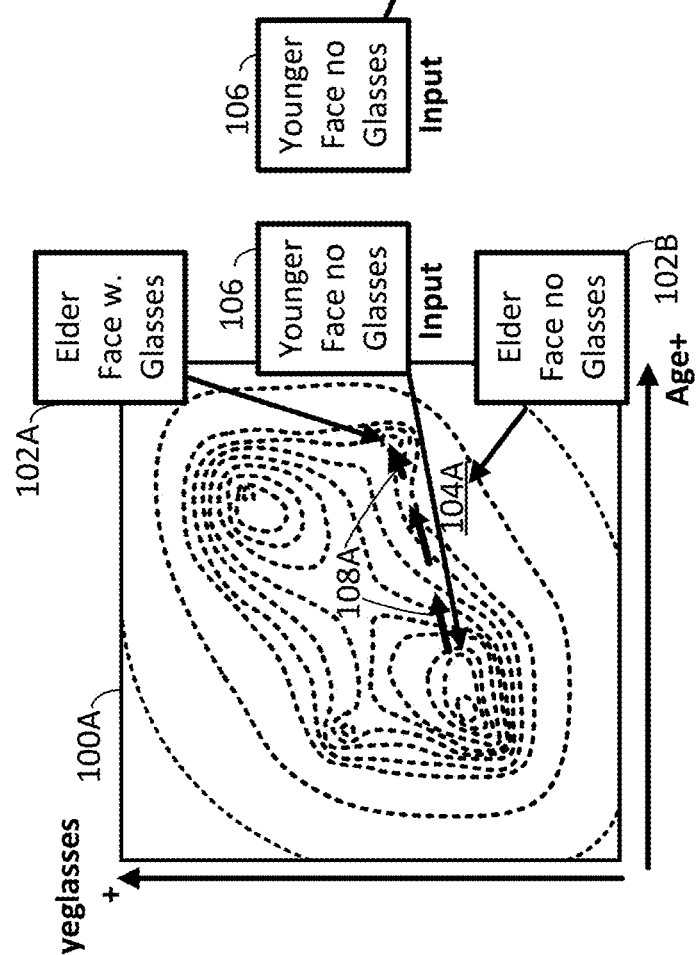
Fig. 1A
Fig. 1B

- Grad-Control [7]
- InterFaceGAN [19]
- Grad-Control [7] +SC$^2$GAN
- InterFaceGAN [19] +SC$^2$GAN

METHODS, APPARATUS AND SYSTEMS INCORPORATING GANS MINIMIZING ATTRIBUTE ENTANGLEMENT USING SELF-CORRECTED GANS SPACES

TECHNICAL FIELD

This disclosure relates to image processing using artificial intelligence (AI), in particular, using generative adversarial networks (GANs), and to applications incorporating such image processing such as image-to-image translation, text-to-image translation, augmented reality applications and virtual try on applications, among others.

BACKGROUND

GANs can synthesize realistic images with the learned latent space shown to encode rich semantic information with various interpretable directions. However, due to the unstructured nature of the learned latent space, bias is inherited from the training data where specific groups of visual attributes tend to appear together. For example, attributes that tend to appear together include age and eyeglasses or women and lipsticks. Consequently, the interpolation following editing directions for one attribute could result in entangled changes with other attributes. To address this problem, previous works typically adjust the learned directions to minimize the changes in other attributes. However, such known approaches can still fail on strongly correlated features.

There is desired an improvement in attribute disentanglement and a desire for an improved GAN framework that provides greater disentanglement.

SUMMARY

Methods, apparatus, systems achieve disentanglement in semantic editing using GANs-based models. Self-corrected (Low-density) latent code samples are generated and projected in the original latent space, and the editing directions corrected though relearning based on both the high-density and low-density regions in the amended latent space (e.g. as merged with the self-corrected latent code samples). Leveraging the original meaningful directions and semantic region-specific layers, in an embodiment, operations interpolate the original latent codes to generate images with minority combinations of attributes, then invert these samples back to the original latent space. In accordance with embodiments, the operations can apply to preexisting methods that learn meaningful latent directions. Resulting GANs models with disentangled editing directions are useful in a variety of applications including virtual reality applications, virtual try on (VTO) applications or other virtual try out applications that simulate an effect of a product or service, among other applications. Attribute disentanglement is improved with small amounts of low-density region samples (e.g. 30 to 1000 samples) added.

BRIEF DESCRIPTION OF THE DRAWINGS

FIGS. 1A and 1B are each a graphical representation of GANs latent spaces where FIG. 1A shows an original latent space and 1B a self-corrected latent space, in accordance with an embodiment.

FIG. 3A shows age clusters fitted with PCAs trained on eyeglasses samples and FIG. 3B shows a project of self-corrected samples (young with eyeglasses and old without eyeglasses) onto the same axes.

Figures 2A, 2B:
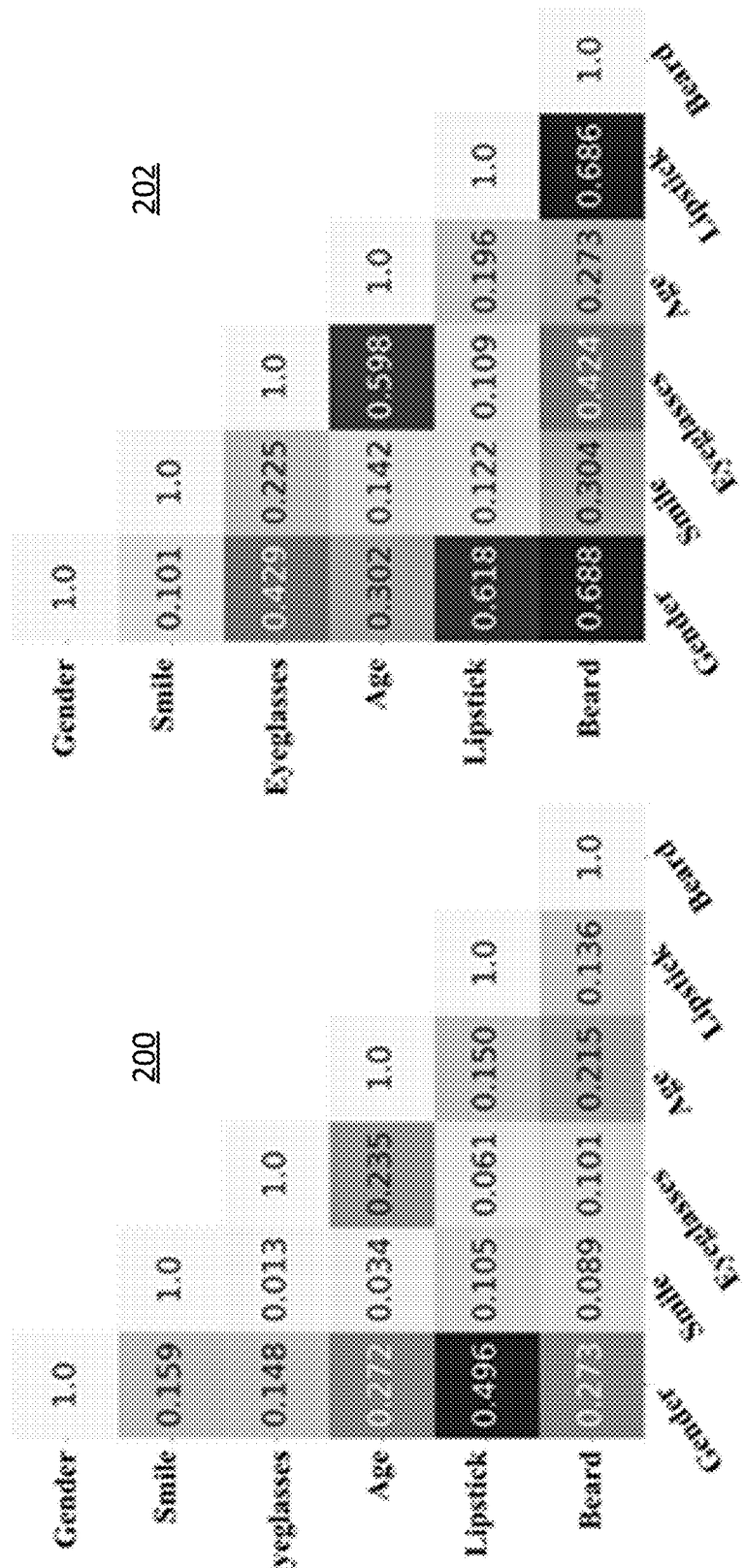
FIGS. 2A and 2B are graphical representations of entanglement showing absolute values of tetrachoric correlations between each attribute pair in the original FFHQ dataset (FIG. 2A) and the StyleGAN2 generated images (FIG. 2B).

The present concept(s) is(are) best described through certain embodiments thereof, which are described herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

DETAILED DESCRIPTION

Recent advances of GANs [9], such as StyleGAN group of work [13, 14, 12], and BigGAN [6], boost a remarkable success for synthesizing photo-realistic images. In addition to a variety of real-world applications such as image-to-image translation [11, 25] or text-to-image translations [24, 15], an-other group of work [3, 4, 23, 10, 19, 7] that studies the interpretability of GANs has caught increasing attention in the research community. GANs training produces respective learned latent spaces that are responsive to the respective training data sets used in the training. A learned latent space is a multi-dimensional space that represents the training data set observed during the training. That is, the latent space for the model encodes the observed data in a meaningful way through a spatial representation. The latent space comprises a number of latent codes (e.g. typically data vectors) representing individual data points in the latent space. Training examples such as individual images in the training data exhibiting similar features, such as similar facial attributes, are often represented in the latent space "closer" together, for example, in a cluster. The noted works study the learned latent space by identifying semantically meaningful directions and interpolating along the learned directions. However, challenges remain to perfectly disentangle correlated features such as age and eyeglasses while obtaining valid feature controls. Thus, semantic face editing seeks to manipulate the facial attributes of a given image with an expectation that the model can change the target attribute while maintaining other information of the input face.

Prior works have largely taken three approaches to obtain disentangled controls: orthogonalization of the learned directions [19], controls based on semantic masks [23], and gradient-based channel filtering [7]. Orthogonalization of the learned directions [19] follows the assumption that for any learned direction, a change along another orthogonal axis should not affect the feature for the learned direction. For example, if A and B are two orthogonal directions that define two hyperplanes, changing along the A axis should not affect its distance to B's hyperplane. This can be achieved through projecting one direction onto another or optimization-based corrections. In practice, as shown in [19], the learned directions are often found as orthogonal yet entangled in the embedding vector space due to the high-dimensional space nature. The second type of strategy [23] utilizes the information within the semantic mask and disentangles the features in different semantic regions. While this shows its effectiveness over more localized at-tributes, it fails to generate controls for global attributes like gender or age. Gradient-based channel filtering [7] selects channels based on the importance with respect to a target attribute. Mathematically, by taking the gradient with respect to each attribute, [7] selects the channels that have the maximal impact on the target attribute while filtering out the channels with the maximal impact on other attributes. However, this could fail if two attributes are strongly correlated and share almost the same set of channels for the decisions.

As a result, questions arise such as what if the original GAN space is "entangled" ? Is the GAN model even able to generate images that never or hardly appeared in the training data, for instance, images of men with lipstick or women with beards? It is hypothesized that the lack of such training data results in non-uniformly distributed density in the learned latent space (as shown in FIGS. 1A and 1B), which leads to the bias of the identified directions. FIGS. 1A and 1B are each graphical representations of respective GAN latent spaces 100A and 100B in accordance with embodiments. FIG. 1A represents a latent space determined using a known approach to training a GAN model while FIG. 1B represents a latent space determined using an approach to training a GAN model in accordance with an embodiment herein where self-correction is used. FIGS. 1A and 1B represent entanglement differences in (facial) attributes eyeglasses and age between the known approach and the approach using self-correction in accordance with an embodiment herein. The contour lines (heavily dashed lines) in 100A and 100B indicate a density of different sub-regions in the learned latent space. Training images 102A and 102B represent an elder face with glasses and an elder face without glasses respectively. The training dataset overall comprises more elder faces with glasses than without glasses. Following (e.g. a conventional) training of the GAN model, as shown in FIG. 1A, the elder face without glasses 102B is associated with a low-density region 104A of the latent space 100A. As shown in FIG. 1B following training using a self-correction approach in accordance with an embodiment herein, image 102B is shown associated with a high-density region 104B of space 100B. FIGS. 1A and 1B show an input image 106 comprising a younger face without glasses and represent how the respective trained GAN models would interpolate an aging effect applied to the input image 106. FIG. 1A shows interpolation (represented by a dashed arrowed line 108A) of the input image toward the sub-region associated with elder faces with glasses, exhibiting entanglement of the attributes eyeglasses and age. However, FIG. 1B shows interpolation (line 108B) toward sub-region 104B with high density of elder faces without glasses, avoiding entanglement. High density regions are open to sample directly through known distribution, like the standard sampling process for GANs by passing a standard Gaussian noise to the network. Low density, in contrast, are regions that the network isn't well trained on and hence are extremely difficult to sample following the standard procedure mentioned above. Minority combinations of attributes comprise those that don't exist or account for less than 5% of all possible combination in the training data, e.g., for combination of lipstick and gender, male with lipstick combination example doesn't exist in the training data.

To support this intuition, the empirical findings of the correlation between different attribute pairs in the original image distribution and how this affects the learned GAN space is thus shown in FIGS. 1A and 1B. Inspired by these empirical findings, a novel framework called $SC^2GAN$ is shown and described to obtain disentangled controls. Manipulated samples with GAN inversion methods are projected back into the low-density regions in the learned latent space to achieve a more balanced latent space distribution. It is shown that the interpretable directions re-learned by different methods with the framework proposed herein applied would be corrected towards the correct cluster, as shown in FIG. 1B.

1. RELATED GANS WORK

GANs [9] are one of the most powerful generative models that have been widely used to tackle various real-world image-related tasks [13, 15, 14]. This section provides an overview of two different categories of approaches to control GAN outputs, as well as the line of work that embeds real images into GAN latent space.

1.1. Image Editing with Conditional GANs

By incorporating class label-related loss terms during training, conditional GANs obtain explicit controls over the image generation process [16, 11, 18], which are able to generate images of classes specified by a user with a class label as input. Nevertheless, they lack controls over multiple attributes hence the entanglement issue can still occur. In the face image generation domain, methods have been proposed to gain more fine-grained controls over multiple attributes [8, 20]. These approaches translate 3D face rendering controls, i.e., 3DMM [5] parameters, into the GAN framework, and are able to control the expressions, pose and illumination while preserving the identity. However, controls learnable by these methods are limited to existing 3D models' parametrization of facial attributes.

1.2. Interpolation in GAN Latent Space

Unlike conditional GANs, another line of work [3, 19, 10, 23] explores controls over output image semantics in GANs trained without labels. They have shown that such GAN latent space encodes rich semantic information with numerous meaningful directions, interpolation along which results in human-interpretable changes in the output semantics. InterFaceGAN [19] employs pre-trained image classifiers to cluster latent codes corresponding to different semantics, and trains state vector machines (SVMs) on those samples to learn the editing direction. Grad-Control [7] works in a similar fashion by training fully connected layers on a small amount of labelled latent codes, and taking the classifier gradient directions as the meaningful path in the latent space. GANSpace [10] works in an unsupervised way by performing PCA on features in the generator, and regressing linear directions in the latent space corresponding to the principal components, which correspond to human-interpretable changes in the image space. StyleSpace [23] learns more fine-grained controls by computing latent channels exclusively activated for semantic regions defined by pre-trained semantic segmentation networks.

Although numerous meaningful directions have been discovered, during interpolation, entanglement in attributes, i.e., changing the target affects other attributes that are assumed to be independent by humans, often occurs. This phenomenon could be ascribed to the nature of the learned latent space, i.e., groups of visual attributes are not guaranteed to be uniformly distributed in the training data, hence the generator captures such property and implicitly encodes it in its latent space. To address this issue, [19] proposes to adjust the editing directions and minimize the change in the entangled attributes by orthogonalizing the target direction from the entangled attribute through projection, while [7] filters out salient latent channels for predicting the entangled attribute during interpolation.

Although the aforementioned techniques achieve some success, disentanglement remains challenging when the correlation between attributes is significantly strong and after the adjustment, the resulting direction only brings trivial changes in the target, or very few channels are left for the target attribute. The approach in [23] suffers less from the entanglement issue as it focuses on attributes belonging to localized semantic regions, but it lacks the ability to edit global attributes like age that require changes over the entire image. Unlike the approaches that directly adjust the biased directions, in accordance with embodiment(s) herein, present methods, apparatus, systems and techniques propose to utilize such directions and correct the biased latent code distributions to learn more disentangled directions.

1.3. GAN Inversion

GAN inversion embeds real-world images into the GAN latent space, which can then be edited with latent space interpolation [1, 2, 14, 21, 22]. There are two main categories of GAN inversion: Optimization-based methods [1, 14, 2], which sample from the original latent space and optimize the latent code to match the output with the real image target, or encoder-based methods [21, 22], which aim to invert the generation process and learn the reverse mapping from image space to the latent space, with the help from training on a large number of latent code-image pairs. One common challenge for GAN inversion is the tradeoff between distortion (i.e., resemblance to the target) and editability (i.e., how close the inverted code lies to the original latent distribution for the latent interpolation directions to be applicable), and different regularization methods have been proposed to handle such tradeoffs [26, 21]. In contrast, in accordance with embodiments herein, employed is a naive latent optimization of W latent codes on W+ interpolation outputs, to achieve little distortion as the results faithfully represent the minority distributions in the original W space.

2. METHODOLOGY

In accordance with embodiments, this section describes obtaining disentangled controls in the StyleGAN W space. First discussed are observations of entanglement in the latent space, followed by a more in-depth analysis that quantifies such phenomena. Lastly, a framework is proposed that learns more disentangled editing directions by generating latent code samples lying in low-density areas to reduce the biases in the original latent sample distribution.

2.1. Observation of Latent Space Entanglement

Disentangling the StyleGAN W space herein is motivated by observations of correlations between pairs of attributes in StyleGAN outputs. GANs map latent codes z from a known distribution $Z \subseteq \mathbb{R}^d$ to an image space $X \subseteq \mathbb{R}^{H \times W \times 3}$ with the mapping function g: Z→X. In StyleGAN [13], instead of directly feeding z to the generative blocks, the output is controlled by a function of w=M(z) where M is a multilayer perceptron network with 8 layers. w vectors are named style vectors lying in the $W \subseteq \mathbb{R}^d$ space, and each w vector is repeated 18 times to a w+ vector and fed to generator layers at different resolutions to generate the final image with G(w+), which has been shown to enable powerful controls of features at different abstraction levels. Nevertheless, multiple works [13, 19, 10] have discovered that, unlike the original Z distribution, the W space distribution is distorted as it captures the correlations between attributes in the training data, resulting in low-density regions for the minority attribute groups.

To visualize such effects, the aggregated faces generated by StyleGAN-FFHQ for a set of attributes were computed, displayed (not shown) and observed. Additionally, averaged faces from a merged dataset containing equal amounts of original W samples and self-corrected samples (e.g. from W+ edits) were computed, visualized (not shown) and observed. Observations reveal the entanglement among different attribute pairs in the first set of averaged faces, e.g., most females are smiling while most males aren't, and old people are likely to wear eye-glasses. By projecting data onto low-density regions in the original clusters, e.g., edited images of old people not wearing eyeglasses or men with lipstick, the corrected distributions show less entanglement in the second set of averaged faces. The result provides intuition for the entanglement issue many previous works that learn semantic editing directions in W [19, 7, 10] suffered, where interpolation for editing one attribute results in changes in multiple attributes.

3.2. Latent Space Entanglement Analysis

FIGS. 2A and 2B are graphical representations of entanglement 200, 202 showing absolute values of tetrachoric correlations between each attribute pair in the original FFHQ dataset (FIG. 2A) and the StyleGAN2 generated images (FIG. 2B).

In order to further explain the findings above, latent space entanglement was analyzed from both the training data and the learned latent distribution perspectives. First, the original FFHQ training data for StyleGAN was analyzed. With FFHQ-features-dataset [17], FIG. 2A presents the correlations measured between each pair of attributes, which exhibits non-trivial correlations between attributes like eyeglasses and age in alignment with the observations of the averaged faces of the first set. Next, the W space was analyzed, leveraging knowledge from pre-trained image classifiers [13]. In an embodiment, an image bank of 500 k synthetic images was created and pseudo labels were predicted for each attribute of interest. A same correlation matrix was then computed as presented in FIG. 2B. The big correlations between certain attribute pairs make the learning of disentangled editing directions challenging. For instance, for eyeglasses and age, since the high-density region for the old mostly contains old people wearing eyeglasses code samples, it's highly likely that when interpolating young latent code without eyeglasses towards the old direction, eyeglasses will be added. Essentially, this corresponds to the overlaps between separation boundaries learned from data generated from the original W distribution.

Figure 3A:
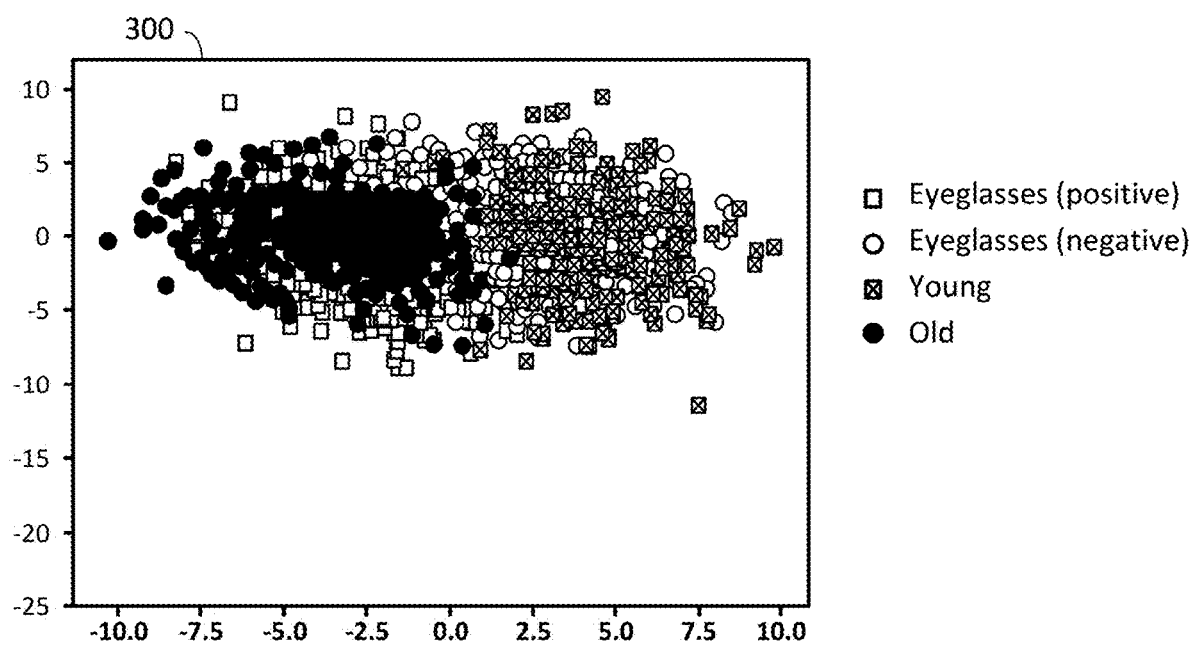
FIGS. 3A and 3B are example visualizations of the latent vector entanglement of eyeglasses and age, which likely share similar decision boundaries and interpolation directions.
Figure 3B:
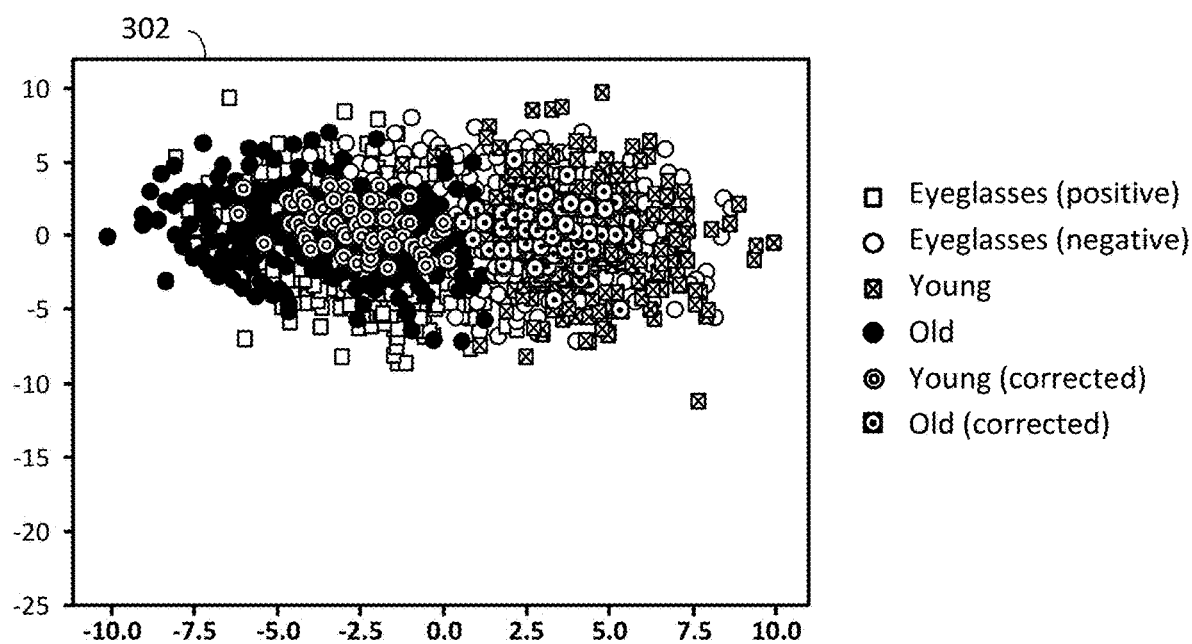
Figure 4A:
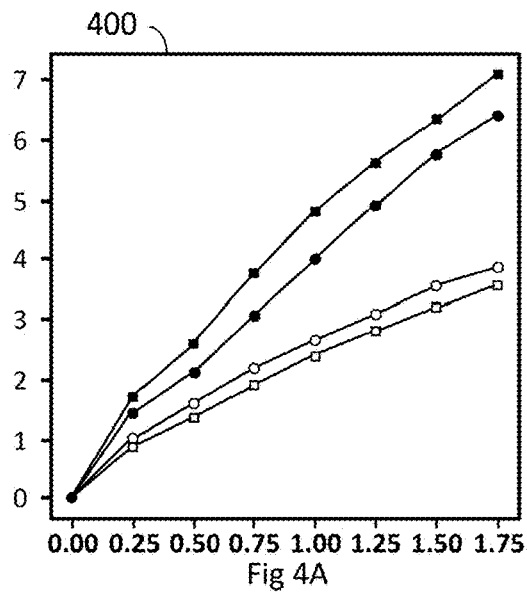
FIGS. 4A, 4B, 4C, 4D and 4E are graphical representations of Attribute Dependency (AD) (lower is better) where each y axis represents mean AD and each respective x axis shows delta logits for, respectively, lipstick, eyeglasses, age, beard and gender.
Figure 4B:
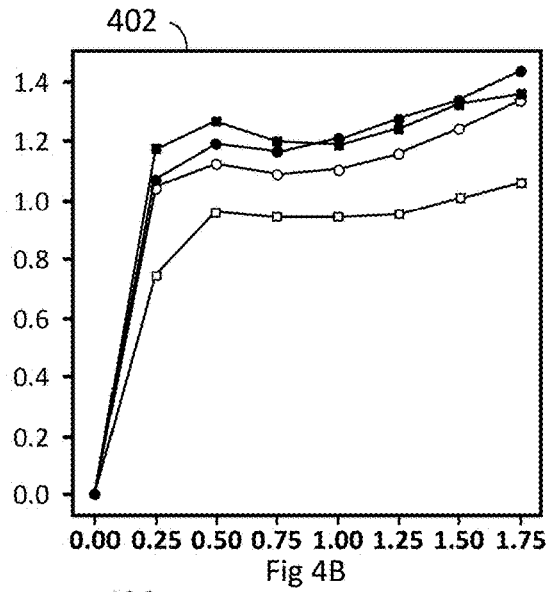
Figure 4C:
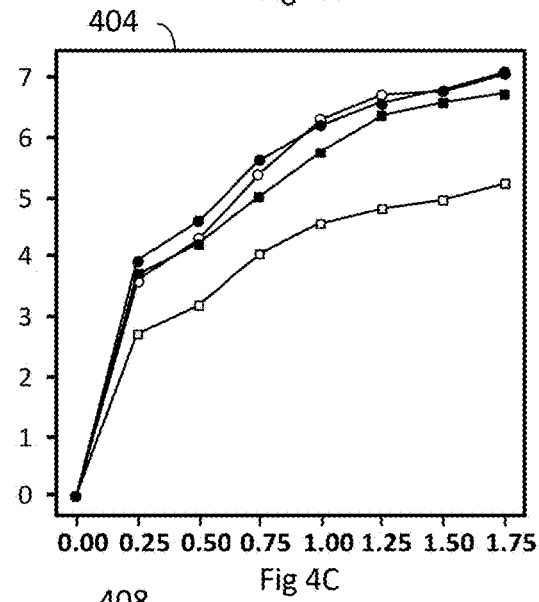
Figure 4D:
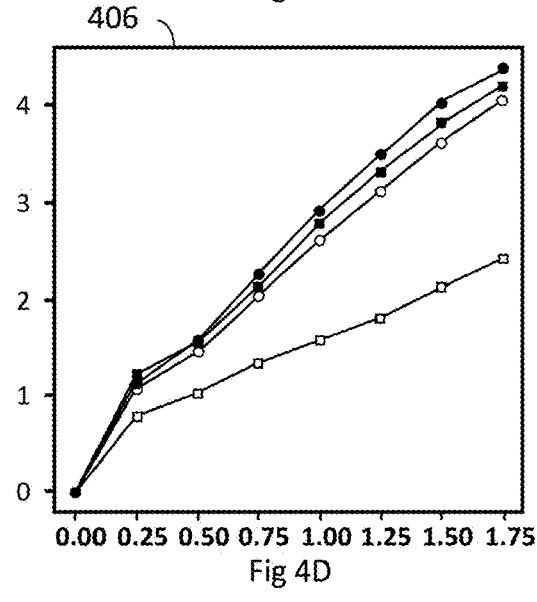
Figure 4E:
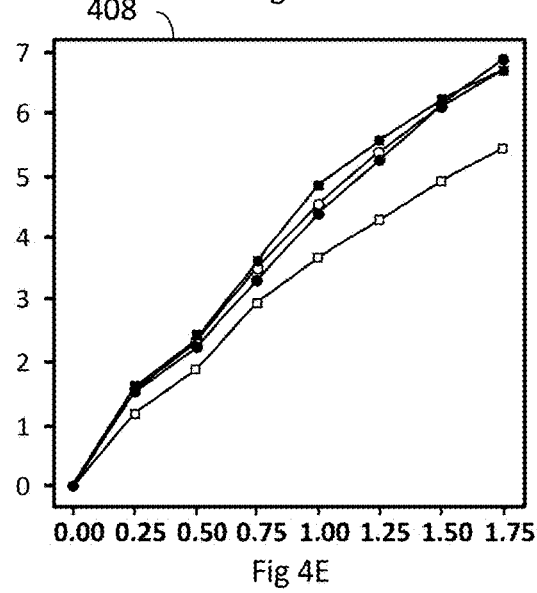

The overlaps between separation boundaries can be visualized using principle component analysis (PCA) techniques and graphing. For example a graph may be generated to visualize latent vector entanglement of eyeglasses and age, which likely share similar decision boundaries and interpolation directions. FIGS. 3A and 3B are example visualizations of the latent vector entanglement of eyeglasses and age 300 and 302, which likely share similar decision boundaries and interpolation directions. FIG. 3A shows age clusters fitted with PCAs trained on eyeglasses samples and FIG. 3B shows a project of self-corrected samples (young with eyeglasses and old without eyeglasses) onto the same axes.

In an example as shown in FIGS. 3A and 3B, age clusters fitted with PCAs trained on eyeglasses samples can be determined and shown graphically. In FIG. 3A there is demonstrated an example visualization of the latent vector entanglement of eyeglasses and age, which likely share similar decision boundaries and interpolation directions. FIG. 3A shows age clusters fitted with PCAs trained on eyeglasses samples. In FIG. 3B, there is projected the self-corrected samples (young with eyeglasses and old without eyeglasses) onto the same axes.

As discussed in [19], for such strong entanglement, orthogonalization of the editing direction through projection does not work well, as it also removes the target direction. Similarly, the salient channels proposed in [7] for both attributes also overlap significantly, making channel filtering prone to fail to disentangle the attributes. Therefore, in accordance with an embodiment, this problem is approachable from a different angle, asking the question: Instead of manipulating the learned editing directions, if one could obtain low-density samples, e.g., old people without eyeglasses in the W space, and create a less biased training distribution for the editing direction, would the newly trained direction be more disentangled?

3.3. Learning Disentangled Directions

In accordance with an embodiment, in order to learn disentangled directions in W, there is introduced a method called SC²GAN, which corrects the bias in the W distribution via self-corrected latent code samples. In accordance with an embodiment, given an entangled editing direction in W, the method first interpolates W codes in W+ following such direction to obtain edited images with localized changes corresponding to minority attribute groups, then projects the edited images back to the W space and re-learns the editing directions with the self-corrected latent codes merged with the original W space training data.

Spatial-wise Editing in W+. As observed in multiple previous works [23, 10, 7], compared to W, the W+ space from StyleGAN enables more localized controls, with W codes fed to layers at different resolutions controlling different abstraction levels, experiments show that the entanglement issue can be alleviated with spatial-wise editing in W+.

In particular, with an entangled W editing direction learned, interpolating along the same direction in attribute-specific W+ layers achieves better disentanglement than interpolating in W, resulting in images with the correct minority attribute groups, such as elder people not wearing eyeglasses. However, W+ interpolation has limited capacity as the changes are mostly limited to specific semantic regions. When editing attributes that involve global-wise deformation, limiting the changes to specific W+ layers sometimes results in the desired target effect not being present. On the contrary, W space modifies the image on a global level with greater ranges of changes available. Nevertheless, W+ interpolation is still useful as it provides access to StyleGAN-generated images with minority attribute groups. It is hypothesized (without prejudice or limitation) that, if these images can be reconstructed from latent codes in the W space, then such a latent code cluster represents the low-density region needed for correcting the entangled W editing direction.

Obtaining Self-corrected Samples in W. To verify the hypothesis above, naive latent optimization is employed and W+ interpolation results are projected to the W space. It is observed that the inverted W codes faithfully reconstruct the W+ editing results and preserve the minority attribute groups well. In other words, these latent codes are self-corrected (disentangled) samples based on the original entangled editing directions, and they can be merged with the original W space samples to create a more balanced distribution for re-learning the editing directions. Operations in Table 1 describes how to obtain self-corrected latent code samples formally, in accordance with an embodiment.

TABLE 1

Algorithm 1 Obtain self-corrected sample w' in W from w for attribute a with semantic editing direction $f_a$ 1: Latent sample w corresponding to w +
2: Generator G, inversion function Inv
3: Set of relevant W + layer indices for editing $aI_a = \{i\}$
4: Interpolation stepsize d, steps s
5: For idx i ∈ $I_a$:
6:     $w +_i = f_a(w, d, s)$
7: w' = Inv(G(w+))
8: Return w'

Per lines 1 and 2 of Table 1, operations provide a sample of latent space code (e.g. w) in W space corresponding to an associated code (e.g. w+) in W+ space such as to control the generation of an edited image sample (i.e. an instances of an edited image) for attribute a along an editing direction (e.g. a semantic direction represented by $f_a$). The attribute a is determined to be one that represents a minority attribute in the distribution—i.e. is associated with a low-density region of the latent space and is entangled with at least one other attribute. The generator G produces an edited image sample and an inversion function Inv inverts such a generated image sample (back) into latent code samples (e.g. w') in W space.

Per line 3 of Table 1, operations provide the applicable parameters for producing an edited image according to the structure of the GAN generator, for example, in accordance with StyleGAN techniques in W+ space. At lines 4 to 6 or Table 1 operations interpolate along the editing direction according to function $f_a$ using the latent code sample and interpolation parameters stepsize d and steps s to build a vector (latent code sample) w+ with which to generate the edited image sample.

At lines 7 and 8, the generator produces the edited image samples G(w+) from the latent code samples w+ as interpolated via lines 4 to 6 of Table 1. The image samples are inverted to produce a new latent code sample w' for merging into W space for re-learning the editing directions using the merged latent space where the distribution (of latent space codes) is more uniform. The directions are re-learned such as in accordance with the technique of the associated Generator. For example, the editing directions are re-learned in a similar manner as the original editing directions but from the merged latent space.

Assuming the original W space distribution has the entanglement issue between attribute $a_1$ and $a_2$, where the high-density regions mostly contain latent codes w with $(a_1-,a_2+)$ and $(a_1+,a_2-)$ semantics in the image space, hence changing the sign of $a_1$ by interpolating in W is likely to cause the opposite change in az. However, given that these two attributes are controlled by W+ layers at different levels, W+ interpolation for editing $a_1$ results in images with $(a_1+,$ $a_2$+) and ($a_1$−, $a_2$−) semantics. Through inversion, w' codes with the same set of semantics are obtained in W space (merged space including w' codes following inversion) hence the strength of $a_2$ in each $a_1$ cluster can be balanced by merging the original w codes with the self-corrected w' codes. By retraining the editing direction for $a_1$ with the corrected distribution in W, $a_1$ is decoupled from the signs of $a_2$, and disentangled and global controls are achieved.

3. EXPERIMENTS

In this section, the framework herein is applied to existing supervised methods that learn editing directions based on W space latent code samples to obtain more disentangled directions.

3.1. Experiment Setup

Models. Experiments were performed on the W space of StyleGAN2 [14] pre-trained on FFHQ [13] with SVM-based [19] and gradient-based [7] editing directions. Samples of 500 k images were made and pseudo labels obtained for attributes gender, smile, eyeglasses, age, lipstick and beard with pre-trained attribute classifiers [13].

Learning the Original Directions. Since the framework, in accordance with embodiments, performs re-training of the learned editing directions, W latent codes are first sampled corresponding to the images with the biggest/smallest logits from the classifier and follow, one of the methods i) SVM-based editing directions [19] or ii) gradient-based editing directions [7] to learn the original W space editing directions.

Learning the Disentangled Directions. With the original editing directions learned, operations of Table 1 are applied to each method and the set of latent code samples to obtain the self-corrected samples. We re-train the directions (respectively using method i) and method ii)) from scratch using the merged dataset containing both self-corrected samples and the original W codes. Implementation details can be found herein below in the section Experiment Details.

3.2. Disentangled Attribute Manipulation

Qualitative results (not shown) for attribute manipulation for gender, age, eyeglasses, lipstick and beard were prepared and presented for observation and comparison. In more detail regarding latent interpolation methods, both [19] and [7] were trained on the same set of 100 latent code samples with the highest classifier confidence for each attribute. For [10] and [23], the original directions as presented in the original paper were used, selecting the channel for "grey hair" as the Age+ channel for [23]. When retraining the SVMs for [19], the negated values of the original scores are taken from the W space training data and used as the pseudo scores for the self-corrected samples. The original directions learned by Grad-Control [7] and InterFaceGAN [19] were compared with editing directions after applying the self-correction framework to both methods. Results were also compared with methods to which the framework was not applicable. GANSpace [10] learns meaningful directions in W by applying PCA to generator features and requires manual examination for semantic meanings, while StyleSpace [23] finds locally activated semantic channels in S space, which is W+ layers with affine transformations applied. For both global attributes (age and gender) and local attributes (lipstick and beard), the self-correction framework boosts disentanglement for both InterFaceGAN [19] and Grad-Control [7]. For instance, disentangled aging effects without eyeglasses was achieved and the female direction was decoupled from smile. GANSpace and StyleSpace suffer little from the entanglement issue, but the amount of change they make for global attributes is extremely limited, e.g., StyleSpace fails to synthesize more female effects, and GANSpace lacks the ability to generate aging effects. In the meantime, for local attributes, with the self-correction framework applied, InterFaceGAN and Grad-Control achieve performance similar to GANSpace and StyleSpace, which operate in spaces of much higher dimensions.

3.3. Quantitative Results: Entanglement Analysis

The level of entanglement was quantitatively measure with Attribute Dependency (AD) proposed by [23]. Experiments on attributes were performed to show non-trivial entanglement in previous analysis, which are gender, eyeglasses, age, lipstick and beard. 3000 test images with all attributes of interest (gender, smile, eyeglasses, age, lipstick, beard) lying around the attribute classifiers' decision boundaries were sampled. The images were split into 5 test sets for AD calculation. Operations to calculate AD on each attribute a in an embodiment are as follows.

For each set of images with target attribute a∈ A, with an editing method $f_a$, where A stands for all attributes, interpolate the original latent codes following [19] and [7] for d=6 in 9 steps.

For each interpolation result at step s, compute $$x = \frac{\Delta l_s^a}{\sigma l^a}$$

which stands for the absolute change in the target attribute logit, normalized by the population standard deviation and obtain the x-values for plotting AD.

For each interpolation result at step s, also compute $$y = \frac{1}{|A|-1} \sum_{i \in A \setminus a} \frac{\Delta l_s^i}{\sigma l^i},$$

which stands for the mean of the absolute change in the other attribute logits, normalized by each population standard deviation, and obtain the y-values for plotting AD.

Then group the (x,y) pairs with their x values into buckets of (0, 0.25], (0.25, 0.5], . . . , (1.75, 2], and plot the midpoint for each bucket as the final x-value, mean of y values within each bucket as the final y-value.

FIGS. 4A to 4E are graphical representations of AD (400, 402, 404, 406 and 408, respectively) where each y axis represents mean AD in all graphs and the x axis shows delta logits for, respectively, lipstick, eyeglasses, age, beard and gender. FIGS. 4A to 4E show that, with the self-correction framework applied, the disentanglement improves significantly for Grad-Control [7] in all attributes. For InterFaceGAN [19], adding the self-corrected data significantly decreases AD for editing lipstick, while for the rest of the attributes the improvement is not as obvious as that of Grad-Control [7]. It is hypothesized (without prejudice or limitation) that this is because [7] supports training with small amounts of data, and the addition of the self-corrected data has significant impacts on the decision boundaries, while [19] requires large amounts of training samples hence less effect of the added self-corrected code on the learned SVM.

3.4. Real Image Manipulation

Experimental results were observed for age and lipstick edits following InterFaceGAN[19] with and without applying $SC^2GAN$ (an embodiment of the self-correction framework). The proposed approach better achieves disentanglement while preserving image identity.

4. ABLATION STUDIES

Number of Self-corrected Samples. It was qualitatively demonstrated how the number of self-corrected samples merged with the original W training data affects the overall editing directions learned by [7] through a presentation of edited images (not shown), as the method in [7] can be trained only on a small dataset. With more self-corrected samples added, the original entanglement with eyeglasses is further minimized, with eyeglasses not appearing with similar aging effects present during interpolation.

Directly Sampling Balanced Data. An alternative approach that obtains the low-density area latent codes is to directly sample from such regions based on the pseudo labels such as from an image bank. However, it was qualitatively demonstrated through a presentation of edited images (not shown) that, although some entanglement can be alleviated with this approach, training with these samples could result in editing direction pointing to areas with lower image quality as the generator is not well-trained in those W regions. Furthermore, the amount of low-density data available for sampling is extremely limited, and as sampling takes whatever is available given the scarcity of such data, these samples could lie close to the original separation boundary. Consequently, they may fail to provide a strong enough signal for the separation boundary to shift significantly.

Comparison with W+ Space Editing. Findings in [13, 10, 7] show W+ space provides localized changes. Nevertheless, for attributes like aging, the editing involves great amounts of deformation of the original semantic regions; hence the localized W+ space edits could fail to achieve the desired target effect, whereas interpolation in the W space is less prone to such failures as it modifies the image on a global level. The difference between spatial-wise W+ interpolation and W interpolation for increasing a baby's age was qualitatively demonstrated through a presentation of edited images (not shown). Both directions learned with the self-correction framework applied to [7] and the original direction with W+ interpolation do not suffer from the entanglement with eyeglasses. Yet, the latter fails to create aging effects like saggy cheeks and ptosis of eyelids, with the changes mostly limited to the initial semantic regions.

Additional Ablation Studies

Additional results were prepared and observed (not shown) that showcased the effectiveness of the self-correction framework on disentangling directions learned by [19] by adding in more self-corrected samples. For all attributes except lipstick, adding in more data helps disentangle the original directions significantly. For lipstick, the initial 100 self-corrected samples are sufficient to correct the biased distribution.

Application(s)

Resulting GANs models with disentangled editing directions are useful in a variety of applications. Image processing applications can include virtual reality applications, virtual try on (VTO) applications or other virtual try out applications that simulate an effect of a product or service, among other applications.

Editing directions can be associated with a user interface such as GUI having user controls for example to control semantic editing of respective attributes using a GAN model associated with the user interface. An example is a face editing application to edit an input image of a face to produce an output image.

Figure 5:
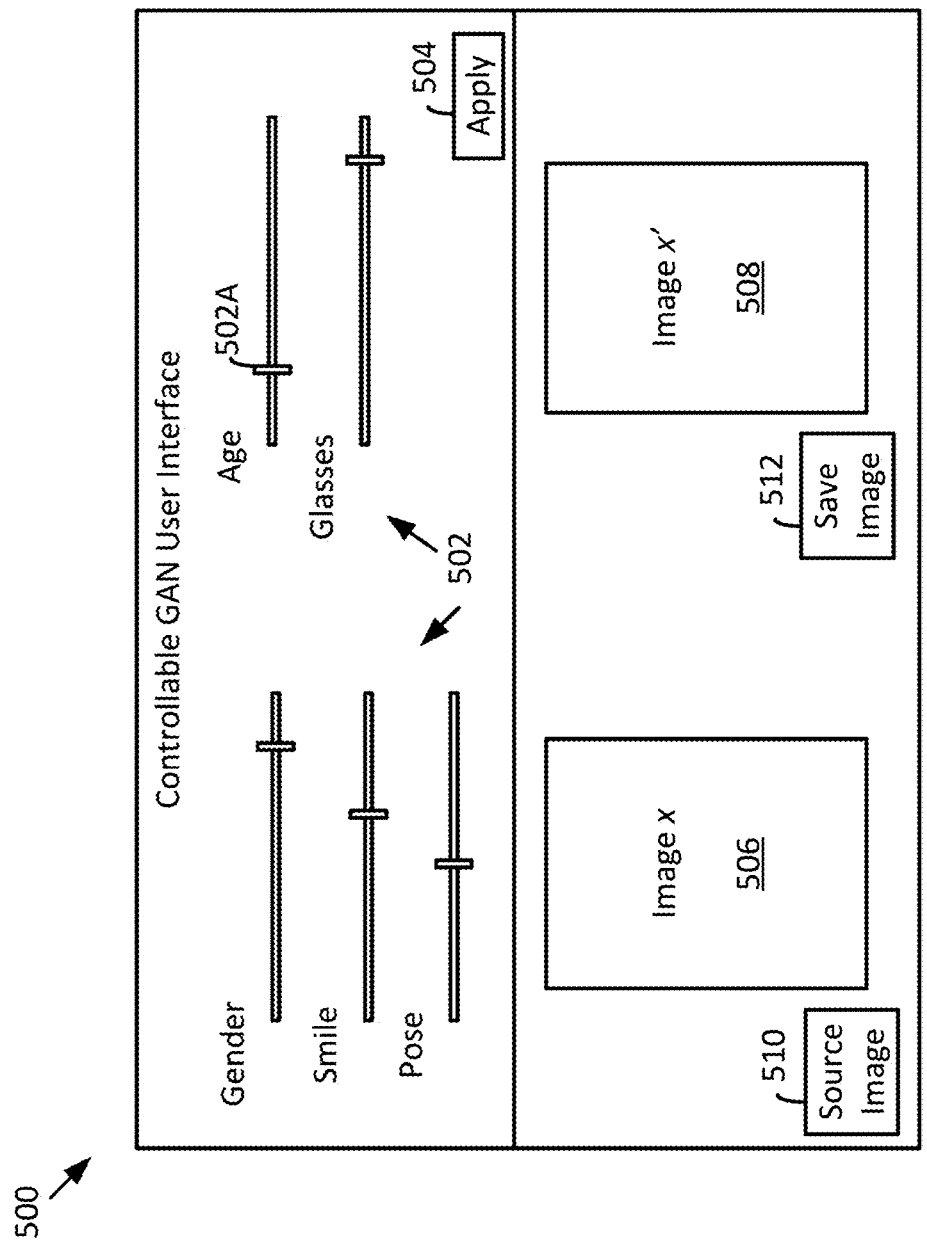
FIG. 5 is a block diagram of a graphical user interface (GUI) to produce a synthesized image from a source image using a controllable GAN, in accordance with an embodiment.

FIG. 5 is a block diagram of a GUI 500, in accordance with an embodiment. GUI 500 may be presented via a display device (not shown). In an embodiment a user can specify the target semantic attribute(s) and the desired amount of the attribute. For example, +smile, −age can identify the attributes and an amount such as a percentage can specify an amount to be present in the synthesized image when the generator is invoked. As the interpolation process is continuous, pre-trained image classifiers (for example) can be used to quantify the amount of the semantic attribute (or amount of change) and find a desired manipulation strength.

GUI 500 shows a plurality of input controls 502 provided to receive selective input for each target semantic attribute for which the GAN model (not shown) was configured and trained. In the present embodiment, each input control (e.g. 502A) shows a slider type control for a respective single attribute and to identify granular input. Other types of input controls (radial controls, text boxes, buttons, etc.) may be used such as for granular or other input. Controls may receive a % value, a range selection, a scalar or other value. For example, an age attribute may be associated to an integer range and accept granular inputs approximating to age in years or decades, etc. Others may select relative ranges for the amount of presence of the attribute—small, medium, large—for example, or child, teen, . . . middle aged, old, etc. These relative ranges can be associated to respective granular values such as 15%, 50%, and 85%, or other values.

Via a selection of an "Apply" control 504, the semantic attribute input or inputs are applied when invoking the generator. The generator's output is controlled by semantic attribute controls derived from the respective auxiliary network semantic attribute classifiers. The semantic attribute input(s) are applied via these attribute controls to a source image x (e.g. 506) to generate a synthesized image x' (e.g. 508 as an output image). The synthesized image can be represented as x'=G(x), as controlled by the attribute controls. And the attribute controls are responsive to the semantic attribute input from interface controls 502. Though all available semantic attributes have a control, a user may elect not to change an attribute and thus the generator need not interpolate along a direction identified within an associated semantic control.

A source image 506 can be identified for use (e.g. uploaded, copied from a storage, obtained via a camera input to obtain a selfie, etc.) via a "source image" control 510. The synthesized image x' 508 obtained can be saved via a "save image" control 512.

Though individual semantic attribute controls are provided for each trained attribute in the illustrated embodiment, in an embodiment (not shown), fewer controls (e.g. for only a single attribute or two attributes, etc.) are provided. Though separate controls are provided for the individual attributes, in an embodiment (not shown), a single control can be provided for combined attributes (e.g. age and gender). Multi-attribute control is computed by vector arithmetic. To make a face with less smile, more eyeglasses, older (more age), the GUI is configured to receive the inputs for the respective directions, namely −smile, +eyeglasses, +age. In accordance with an embodiment of operations of a computing device, the inputs are associated to respective gradient vectors (of associated semantic attribute controls) and the vectors are added up, and normalized. The generator interpolates (linearly) along the computed direction (i.e. combined directions) to produce the output image.

In an embodiment, the GUI is provided by a first computing device (not shown) and the generator is provided by another computing device (not shown) remotely located relative to the first computing device. The other computing device can provide the controllable GAN generator as a service. The first computing device providing the GUI is configured to communicate the input image and semantic attribute direction inputs (e.g. as percent values or other inputs) to the remotely located computing device providing (e.g. executing) the generator. Such a remotely located computing device can provide an application programming interface (API) or other interface to receive the source image (or a selection) and the semantic attribute direction inputs. The remotely located computing device can compute the direction vector and invoke the generator applying the semantic attribute controls. In an alternative embodiment, the computing device providing the GUI can be the same as the computing device providing the generator.

In an embodiment, in addition to developer (e.g. used at training time) and target (used at inference time) computing device aspects, a person of ordinary skill will understand that computer program product aspects are disclosed, where instructions are stored in a non-transient storage device (e.g. a memory, CD-ROM, DVD-ROM, disc, etc.) that when executed cause a computing device to perform any of the method aspects disclosed herein. In an embodiment, a computing device comprises a processor (e.g. a microprocessor (e.g. a CPU, a GPU, a plurality of any of same), microcontroller, etc.) that executes computer readable instructions such as those stored in the storage device. In an embodiment, the computing device comprises (for example "purpose built") circuitry that executes the functions of the instructions, for example, without the need to read such instructions.

Also shown and described are e-commerce system related aspects. A user's computing device, in an embodiment, is configured as a client computing device in relation to the e-commerce system. The e-commerce system, for example, stores a computer program for such a client computing device. Thus the e-commerce system has as a component thereof a computer program product, which product stores instructions which when executed by (e.g. a processing unit of) the client computing device configures such a client computing device. These and other aspects will be apparent.

Figure 6:
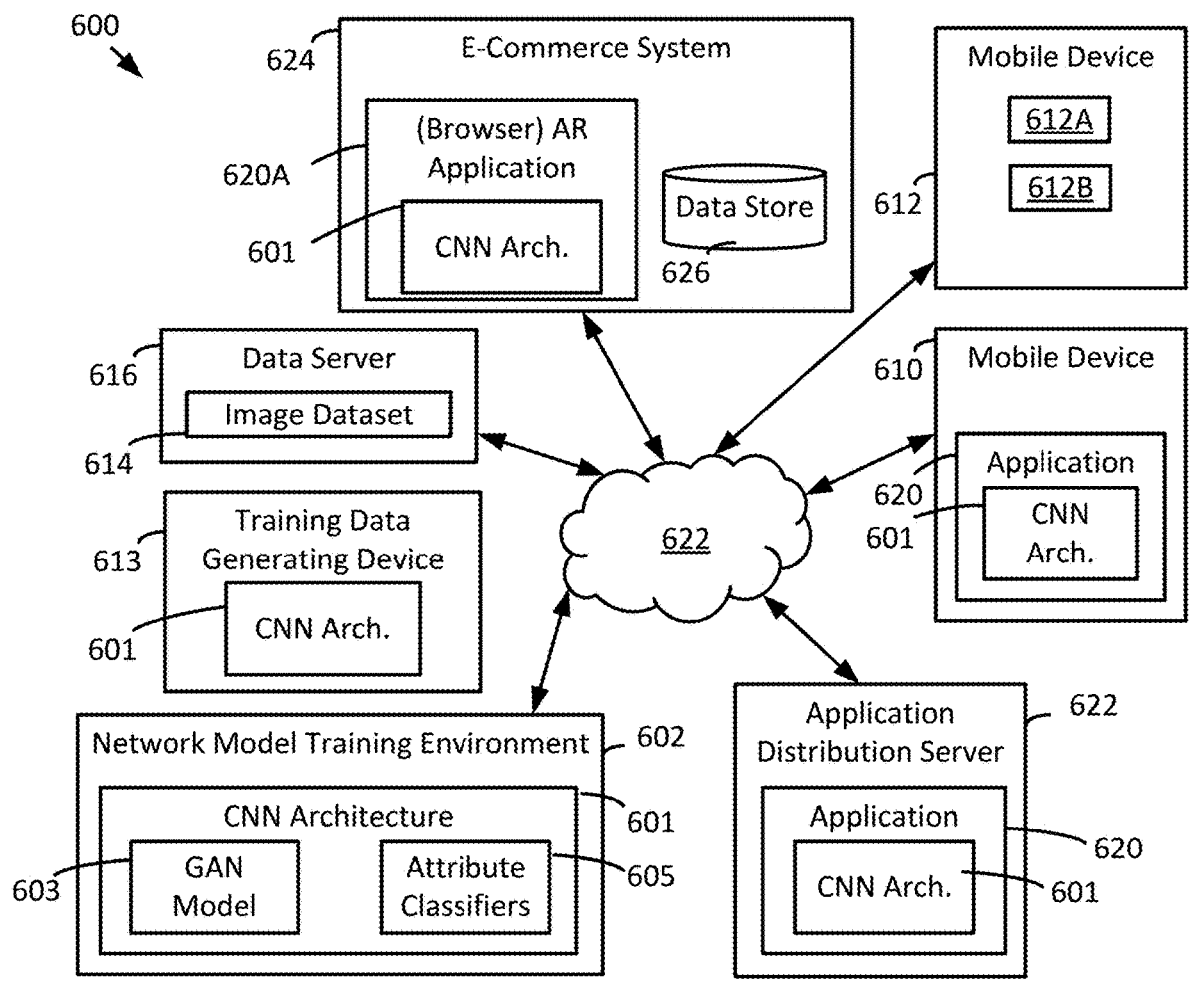
FIG. 6 is a block diagram of a computer system, in accordance with an embodiment.

FIG. 6 is a block diagram of a computer system 600. In an embodiment, computer system 600 comprises a plurality of computing devices which, in an embodiment, includes servers, developer computers (PCs, laptops, etc.) and mobile devices such as smartphones and tablets, etc. There is shown a network model training environment 602 comprising hardware and software to define and configure, such as through conditioning, a GANs-based CNN architecture 601. Architecture 601 comprises a GAN-based model 603 (e.g. comprising a generator G with a plurality of editing directions) and network based classifiers 605 (e.g. a plurality of classifiers for determining presence of particularly semantic attributes). Other types of classifiers can be used. In embodiment, classifiers 605 are useful for determining editing directions. Once GAN model 603 is trained and the editing directions are disentangled such as described herein using the self-correction framework, the GAN 603 can be useful to produce edited images as output without need to use the classifiers 605.

In an embodiment, GAN model 603 and, optionally, as may be required, attribute classifiers 605, (e.g. CNN 601), once trained, is provided for use on a target device such as one of the mobile devices 610, 612 of the system 600 or other devices such as 613. Mobile devices 610 are representative user computing devices, for example, consumer users. It is understood that such users may use other forms of computing device such as a desktop computer, workstation etc. Device 613 represents a computing device to preform training data generating (hence a training data generating device). In this embodiment, such a computing device employs generator (GAN Model 601) to generate additional image data which can be easily labelled with semantic attributes (e.g. using attribute classifiers 605) and can be used to train a network model (e.g. in a supervised manner). The form factor of device 613 can be a server, a laptop, a desktop, etc. and need not be a consumer type mobile device such as a tablet, smartphone, etc.

In an embodiment, network model training environment 602 employs, at least in part, a GAN model 603 that is pre-trained for the image task (e.g. face image generation). The generator is pre-trained such as by using an image dataset 614 stored at a data server 616. In an embodiment, the model 603 is a model developed "in-house". In an embodiment, the model 603 is publicly available such as via an open source license. The dataset 614 can be similarly developed and available (e.g. as an open source dataset). Depending on the type of image task and network architecture (e.g. supervised), the training is supervised and the dataset annotated according for such training. In other scenarios, the training is unsupervised and the data defined accordingly.

In an embodiment, the generator 603 and, optionally, as may be desired, classifiers 605 are incorporated into an application 620, such as an augmented reality (AR) or virtual reality (VR) application, etc. Though not shown, in an embodiment, the application 620 is developed using an application developer computing device for particular target devices having particular hardware and software, particularly, a target operating system configuration. In an embodiment, the application 620 is a native application configured for execution in a specific native environment such as one defined for a particular operating system (and/or hardware). In an embodiment, the application 620 takes the form of a browser-based application, for example, configured to execute in a browser environment of the target device.

In an embodiment, the application 620 is distributed (e.g. downloaded) by user devices such as mobile devices 610 and 612. Native applications are often distributed through an application distribution server 622 (e.g. a "Store" operated by a third party service), though this is not necessary.

In an embodiment (not shown), application 620 does not include CNN architecture 601 per se (i.e. does not include the generator and auxiliary network). Rather application 620 is configured with an interface to communicate with a remote device providing these components as a service (not shown), for example, as a cloud-based service. Storage and execution of the generator and auxiliary network is resource intensive and can be too large/demanding for some computing devices. Other reasons may also factor into the paradigm of the application 620.

In an embodiment, application 620 is configured to provide an augmented reality experience (for example via an interface) to a user. For example, an effect is provided to an image via processing by the generator 603. In an embodiment, one or more effects are provided via other operations, which can include other deep networks, effects pipelines, etc. In an embodiment, effects are provided to simulate application of a product or service, such as further described below.

In an embodiment, mobile device 610 or 612 comprises a camera (not shown) to capture an image (e.g. a still or video image, whether a selfie image or not). In an embodiment, the effect is applied to the image, for example, to the video image, and displayed on a display device (not shown) of the mobile device 610 or 612 to simulate an effect on a user image. In some embodiments the effects are applied in (near) real-time. As the position of the camera is changed, the effect is applied in response to the image(s) of the video as captured to simulate the augmented reality. As will be appreciated, real-time operation is constrained by processing resources. In an embodiment, an effect is not simulated in real-time but is delayed, which may impact the augmented reality experience.

In an embodiment, the computing devices are coupled for communication via one or more networks (e.g. 622), which comprise wireless networks or otherwise, public networks or otherwise, etc.

By way of example, but without limitation, an e-commerce system 624 is web-based and provides a browser-based AR application 620A as a component of an e-commerce service provided by the e-commerce system 624. E-commerce system 624 comprises a configured computing device and a data store 626 (e.g. a database or other configuration). Data store 626 stores data about products, services, and related information (e.g. techniques for applying a product). Data store 626 or other data storage devices (not shown) stores recommendation rules or other forms of product and/or service recommendations, etc. to assist a user to choose among available products and services. The products and services are presented via a user-experience interface displayed on a user's (mobile) computing device. It will be appreciated that the e-commerce system 624 is simplified.

In an embodiment, browser-based AR application 620A (or application 920) provides an augmented reality customer experience such as to simulate a product, technique or service provided or facilitated by the e-commerce system 624. It will be understood that application 920, in an embodiment, is also configured to provide e-commerce services such as via a connection to e-commerce service 624.

By way of example, but without limitation, a product comprises a cosmetic (e.g. makeup) product, an anti-aging or rejuvenation product, and a service comprises a cosmetic, an anti-aging or a rejuvenation service. A service comprises a treatment or other procedure. The product or service relates to a portion of a human body such as a face, hair or nails. In an embodiment, a computing device (such as mobile device 612) so configured thus provides a face-effect unit 612A including processing circuitry configured to apply at least one facial effect to the source image and to generate one or more virtual instances of an applied-effect source image (e.g. displayed) on an e-commerce interface of the computing device that is facilitated by the e-commerce system. In an embodiment, the face-effect unit 612A utilizes the generative adversarial network (GAN)-based generator (g) and optionally as may be desired, classifiers 605 such as is described herein, to produce the applied-effect source image. In an embodiment, the computing device provides a user-experience unit 612B including processing circuitry to determine at least one product or service from the data store 626 and to generate one or more virtual instances of a recommendation on an e-commerce interface to purchase products or services. In an embodiment, the at least one product is associated with a respective facial effect and the face-effect unit applies the respective facial effect to provide a virtual try on experience.

In an embodiment, the user experience unit 612B is configured to present a graphical user interface (e.g. browser based or otherwise) to work with the computing device 612 and the e-commerce system 624. In an embodiment, the e-commerce system 624 is thus configured to provide the AR application for execution by client computing devices such as a mobile device (e.g. 612) and is cooperatively configured to provide e-commerce services to the client computing device to facilitate (product/service) recommendations for AR simulation via the client computing device (e.g. 612) and facilitate purchases.

Thus, any of the computing devices, but particularly the mobile devices, provide a computing device to translate an image from a first domain space to a second domain space. The computing device comprises a storage unit storing a generative adversarial network (GAN)-based model (e.g. generator (g)), configured to generate images controlled for semantic attributes. In an embodiment, the computing device comprises a processing unit configured to (e.g. via the AR application 620): receive the source image; receive input to identify at least one semantic attribute to be controlled, for example, including input to refine the semantic attribute (e.g. a percent); provide the image to the generator g to obtain a synthesized (e.g. new) image responsive to the semantic attribute input; and provide the new image for presenting.

In an embodiment the generator is configured to synthesize a particular semantic attribute that comprises one of: a facial feature comprising age, gender, smile, or other facial feature; a pose effect; a makeup effect; a hair effect; a nail effect; a cosmetic surgery or dental effect comprising one of a rhinoplasty, a lift, blepharoplasty, an implant, otoplasty, teeth whitening, teeth straightening or other cosmetic surgery or dental effect; and an appliance effect comprising one of an eye appliance, a mouth appliance, an ear appliance or other appliance effect.

In an embodiment, the synthesized output of generator g (e.g. the synthesized or new image) is provided to a second network model, for example, for a face editing task. The second network model can comprise a second generator or a feature detector and a simulator to apply an effect (e.g. producing a further new image). The effect can be presented in an AR interface. In an embodiment, the processing unit is configured to provide the synthesized image (or a further new image defined therefrom) in an augmented reality interface to simulate an effect applied to the image. In an embodiment, the effect comprises any of a makeup effect, a hair effect, a nail effect, a cosmetic surgery or dental effect, an appliance effect or other simulation effect applied. In an embodiment, the source image comprises an applicable portion (e.g. face, hair, nails or body portion) of a subject such as a user of the device.

The network model training environment 602 provides a computing device configured to perform a method such as a method to configure by conditioning a GANs-based generator and the classifiers (e.g. the classifiers and GAN model may share the same latent space in an embodiment). It will be understood that embodiments of the computing device aspect of the network model training environment 602 and any related embodiments of, for example, the generator or model, apply to the training method aspect, with suitable adaptation.

Figure 7:
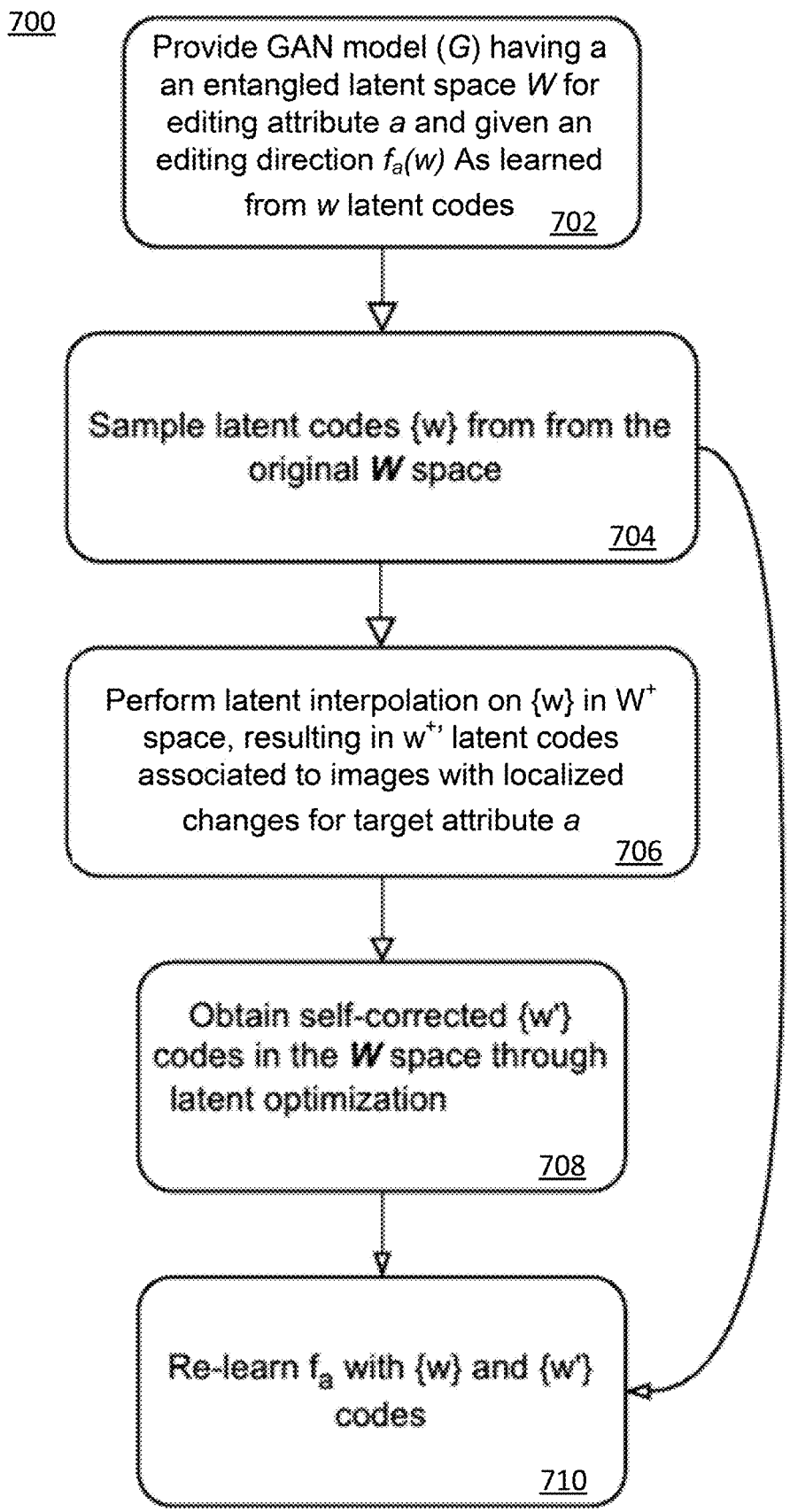
FIG. 7 is a flowchart showing operations in accordance with an embodiment herein.

FIG. 7 is a flow chart of operations 700 in accordance with an embodiment herein. Operations 700 can be performed such as by computing device 602, in an embodiment. There is provided to the computing device at step 702 a GAN model (e.g. 601) having a generator G and an entangled latent space W for editing attributes a∈A given an editing direction $f_a(w)$ where the editing direction is learned from the w latent codes in accordance with, for example, a conventionally known technique as described herein. At 704 operations obtain a plurality of latent codes samples {w} (e.g. a subset of W space) from the original latent space W. In an embodiment, sampling applied respective attribute classifiers to a broad set of images comprising 500K images to obtain confidence scores for each attribute. Sampling is responsive to the scores, for example, picking latent codes corresponding to ones with highest confidence scores for a particular attribute or lowest scores. Sampling in an embodiment is further responsive to one or more other attributes such as for balancing purposes, for example, picking a balanced subset that takes into account gender—50/50 split of samples.

At 706 latent interpolation is performed on the latent codes {w} in $W^+$ space following the expressions in Table 1 at lines 4 to 6 for a target attribute (e.g. a). The resulting {w+'} latent codes correspond to images with localized changes for the target attribute a.

At 708 operations obtain self-corrected latent codes {w'} in W space through latent optimization, applying inversion, in accordance with the expression of line 7 of Table 1.

At 710, operations re-learn the editing direction $f_a$ for attribute a with the latent codes {w} and self-corrected latent codes {w'}(e.g. as merged).

Consistory Statements

In accordance with the embodiments herein, various aspects will be apparent to a person of ordinary skill in the art, including those set out in the following numbered Statements.

Statement 1: A method to disentangle a target entangled semantic attribute editing direction of a plurality of semantic attribute editing directions learned from a first latent space of a generative adversarial network (GAN) model, the target entangled semantic attribute editing direction learned for generating edited images in relation to a target semantic attribute, the method comprising: re-learning the target entangled semantic attribute editing direction from a merged latent space for the target semantic attribute, the merged latent space comprising self-corrected latent code samples generated from interpolations along the target entangled semantic attribute editing direction to obtain edited image samples having localized changes corresponding to the target semantic attribute, and wherein the target semantic attribute comprises a minority attribute in a training dataset used to obtain the first latent space.

Statement 2: A method to disentangle a target entangled semantic attribute editing direction of a plurality of semantic attribute editing directions, each of the semantic attribute editing directions learned from a first latent space of a generative adversarial network (GAN) model for generating edited images and the target entangled semantic attribute editing direction learned for generating edited images in relation to a target semantic attribute, the method comprising:
generating self-corrected latent code samples, each self-corrected latent code sample generated by interpolating a latent code sample from the first latent space along the target entangled editing direction to obtain an edited image sample having localized changes corresponding to the target semantic attribute, wherein the target semantic attribute comprises a minority attribute as represented in the first latent space;
using the self-corrected latent code samples to define a merged latent space for re-learning the target entangled semantic attribute editing direction for the target semantic attribute; and
re-learning the target entangled semantic attribute editing direction using the merged latent space.

Statement 3: The method of Statement 2, wherein the first latent space comprises an intermediate latent space determined for controlling the generation of the edited images using at least some of the plurality of editing directions.

Statement 4: The method of Statement 3, wherein the GAN model comprises a model defined in accordance with a StyleGAN technique and the intermediate latent space comprises a W space in accordance with the StyleGAN technique for generating the edited images.

Statement 5: The method of Statement 1, wherein: the GAN model maps latent codes z from a known distribution $Z \subseteq R^d$ to an image space $X \subseteq R^{H \times W \times 3}$ with a mapping function g: Z→X; and the first latent space comprises an intermediate latent space $W \subseteq R^d$ such that the edited images are controlled by a function of w=M(z) where M is a multilayer perceptron network, w latent code samples lies in the intermediate latent space W and each w latent code sample is repeated to a provide a w+ latent code sample and fed to generator layers of a generator G of the GAN model at different resolutions to generate the edited images in accordance with G(w+).

Statement 6: The method of Statement 2 comprising inverting each edited image sample to determine the self-corrected latent code samples in space W.

Statement 7: The method of Statement 2 comprising learning the plurality of semantic attribute editing directions including the target semantic attribute editing direction.

Statement 8: The method of Statement 2, wherein the training dataset comprises images in which the minority attribute is present with a second attribute such that minority attribute and second attribute are entangled in the first latent space.

Statement 9: An apparatus comprising: a generative adversarial network (GAN) model comprising at least a first re-learned semantic attribute editing direction in which a first semantic attribute editing direction associated with a first semantic attribute is disentangled from a second semantic attribute editing direction associated with a second semantic attribute, the first semantic attribute editing direction re-learned using a merged latent space comprising self-corrected latent code samples, the self-corrected latent code samples generated to balance a data distribution representing the first semantic attribute; and an interface to operate the GAN model to generate edited images using the at least the first re-learned editing direction.

Statement 10: The apparatus of Statement 9, wherein the self-corrected latent code samples are generated from interpolations along the first editing direction as entangled to obtain edited image samples with localized changes corresponding to a minority attribute as represented in a first latent space from which the first editing direction is first learned.

Statement 11: The apparatus of Statement 10, wherein the at least a first re-learned semantic attribute editing direction, the first semantic attribute editing direction and the second semantic attribute editing direction all comprise one of i) state vector machine-based (SVM-based) editing directions or ii) gradient-based editing directions.

Statement 12: The apparatus of Statement 9, wherein the interface to operate the GAN model is configured to receive an input image for generating an output image, the output image edited along one or more of a plurality of editing directions, the plurality of editing directions comprising the at least the first-relearned editing direction.

Statement 13: The apparatus of Statement 12 comprising a user interface to receive the input image and present the output image.

Statement 14: The apparatus of Statement 12 comprising an effects simulation engine for applying one or more effects to either or both of the input image to the GAN model or the output image of the GAN model.

Statement 15: The apparatus of Statement 14 wherein: the simulation engine comprises a virtual try on (VTO) engine that simulates an effect of a product or service; and the apparatus comprises one or both of i) an e-commerce interface to purchase the product or service; and ii) a recommendation engine to recommend the product or service.

Statement 16: The apparatus of Statement 15, wherein the product comprises a beauty product.

Statement 17: The method of Statement 2 wherein the at least a first re-learned semantic attribute editing direction, the first semantic attribute editing direction and the second semantic attribute editing direction all comprise one of i) state vector machine-based (SVM-based) editing directions or ii) gradient based editing directions.

Statement 18: A computing device comprising circuitry configured to provide a virtual try on (VTO) experience, the circuitry configured to provide:
- an editing interface to a generative adversarial network (GAN) model having a plurality of semantic attribute editing directions configured to edit semantic attributes in an input image to produce an edited output image, the plurality including a first semantic attribute editing direction, associated with a first attribute, that is disentangled from a second semantic attribute editing direction, the first semantic attribute editing direction disentangled through re-learning the first semantic attribute editing direction using a merged latent space comprising i) self-corrected latent codes generated to balance a distribution of latent codes associated with the first semantic attribute in the merged latent space and ii) uncorrected latent codes associated with the first semantic attribute used to learn the first semantic attribute editing direction as entangled;
- an effects interface to an effects engine configured to simulate an effect to either the input image or the edited output image from the GAN model, the effect associated with a product, a service, or both a product and service; and
- an e-commerce interface with which to purchase products, services or both products and services that are available for simulation through the VTO experience.

Statement 19: The computing device of claim 18, wherein the product comprises any of a makeup product; a hair coloring product; a nail coloring product; or a skin, hair or nail treatment product.

Statement 20: A computing device, system or apparatus comprising one or more processors configured to perform a method in accordance with any one of Statements 1 to 8 and 17.

Statement 21: A computer program product comprising a non-transient storage device storing computer-readable instructions for execution by a processor to cause a computing device to perform any one of the method Statements herein.

Any of the dependent Statements can be multiply dependent unless the context requires otherwise.

6. CONCLUSION

We study the entanglement problem in the W space of StyleGAN2 and propose $SC^2GAN$, a simple yet effective method that generates self-corrected samples in low-density regions to obtain disentangled controls. With these self-corrected samples added to the original W distribution, we learn decoupled separation boundaries that enable disentangled editing. The framework shows strong capability to disentangle attributes with similar separation boundaries and salient channels in the original latent space, and only requires small amounts of data to correct the distribution (e.g. 30 to 1000 codes).

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

REFERENCES (The Contents of Each Document Below are Included Herein by Reference in their Respective Entireties)

[1] Rameen Abdal, Yipeng Qin, and Peter Wonka. Image2stylegan: How to embed images into the stylegan latent space? In Proceedings of the IEEE/CVF International Conference on Computer Vision, pages 4432-4441, 2019.

[2] Rameen Abdal, Yipeng Qin, and Peter Wonka. Image2stylegan++: How to edit the embedded images? In Proceedings of the IEEE/CVF conference on computer vision and pattern recognition, pages 8296-8305, 2020.

[3] David Bau, Jun-Yan Zhu, Hendrik Strobelt, Bolei Zhou, Joshua B. Tenenbaum, William T. Freeman, and Antonio Torralba. Gan dissection: Visualizing and understanding generative adversarial networks. In Proceedings of the International Conference on Learning Representations (ICLR), 2019.

[4] David Bau, Jun-Yan Zhu, Jonas Wulff, William Peebles, Hendrik Strobelt, Bolei Zhou, and Antonio Torralba. Seeing what a gan cannot generate. In Proceedings of the IEEE/CVF International Conference on Computer Vision, pages 4502-4511, 2019.

[5] Volker Blanz and Thomas Vetter. A morphable model for the synthesis of 3d faces. In Proceedings of the 26th annual conference on Computer graphics and interactive tech-niques, pages 187-194, 1999.

[6] Andrew Brock, Jeff Donahue, and Karen Simonyan. Large scale GAN training for high fidelity natural image synthesis. In International Conference on Learning Representations, 2019.

[7] Zikun Chen, Ruowei Jiang, Brendan Duke, Han Zhao, and Parham Aarabi. Exploring gradient-based multi-directional controls in gans. In Computer Vision-ECCV 2022: 17th European Conference, Tel Aviv, Israel, Oct. 23-27, 2022, Proceedings, Part XXIII, pages 104-119. Springer, 2022.

[8] Yu Deng, Jiaolong Yang, Dong Chen, Fang Wen, and Xin Tong. Disentangled and controllable face image generation via 3d imitative-contrastive learning. In Proceedings of the IEEE/CVF conference on computer vision and pattern recognition, pages 5154-5163, 2020.

[9] Ian Goodfellow, Jean Pouget-Abadie, Mehdi Mirza, Bing Xu, David Warde-Farley, Sherjil Ozair, Aaron Courville, and Yoshua Bengio. Generative adversarial nets. Advances in neural information processing systems, 27, 2014.

[10] Erik Härkönen, Aaron Hertzmann, Jaakko Lehtinen, and Sylvain Paris. Ganspace: Discovering interpretable gan controls. Advances in Neural Information Processing Systems, 33:9841-9850, 2020.

[11] Phillip Isola, Jun-Yan Zhu, Tinghui Zhou, and Alexei A. Efros. Image-to-image translation with conditional adversarial networks. In Proceedings of the IEEE Conference on Computer Vision and Pattern Recognition (CVPR), July 2017.

[12] Tero Karras, Miika Aittala, Samuli Laine, Erik Härkönen, Janne Hellsten, Jaakko Lehtinen, and Timo Aila. Alias-free generative adversarial networks. Advances in Neural Infor-mation Processing Systems, 34:852-863, 2021.

[13] Tero Karras, Samuli Laine, and Timo Aila. A style-based generator architecture for generative adversarial networks. In Proceedings of the IEEE/CVF conference on computer vision and pattern recognition, pages 4401-4410, 2019.

[14] Tero Karras, Samuli Laine, Miika Aittala, Janne Hellsten, Jaakko Lehtinen, and Timo Aila. Analyzing and improving the image quality of stylegan. In Proceedings of the IEEE/CVF conference on computer vision and pattern recognition, pages 8110-8119, 2020.

[15] Bowen Li, Xiaojuan Qi, Thomas Lukasiewicz, and Philip Torr. Controllable text-to-image generation. Advances in Neural Information Processing Systems, 32, 2019.

[16] Mehdi Mirza and Simon Osindero. Conditional generative adversarial nets. arXiv preprint arXiv:1411.1784, 2014.

[17] mrmartin. ffhq-features-dataset. URL: github.com/DCGM/ffhq-features-dataset, 2019.

[18] Augustus Odena, Christopher Olah, and Jonathon Shlens. Conditional image synthesis with auxiliary classifier gans. In International conference on machine learning, pages 2642-2651. PMLR, 2017.

[19] Yujun Shen, Ceyuan Yang, Xiaoou Tang, and Bolei Zhou. Interfacegan: Interpreting the disentangled face representation learned by gans. IEEE transactions on pattern analysis and machine intelligence, 2020.

[20] Ayush Tewari, Mohamed Elgharib, Gaurav Bharaj, Florian Bernard, Hans-Peter Seidel, Patrick Perez, Michael Zollhofer, and Christian Theobalt. Stylerig: Rigging style-gan for 3d control over portrait images. In Proceedings of the IEEE/CVF Conference on Computer Vision and Pattern Recognition, pages 6142-6151, 2020.

[21] Omer Tov, Yuval Alaluf, Yotam Nitzan, Or Patashnik, and Daniel Cohen-Or. Designing an encoder for stylegan im¬age manipulation. ACM Transactions on Graphics (TOG), 40(4):1-14, 2021.

[22] Tengfei Wang, Yong Zhang, Yanbo Fan, Jue Wang, and Qifeng Chen. High-fidelity gan inversion for image attribute editing. In Proceedings of the IEEE/CVF Conference on Computer Vision and Pattern Recognition, pages 11379-11388, 2022.

[23] Zongze Wu, Dani Lischinski, and Eli Shechtman. Stylespace analysis: Disentangled controls for stylegan image genera-tion. In Proceedings of the IEEE/CVF Conference on Com-puter Vision and Pattern Recognition, pages 12863-12872, 2021.

[24] Han Zhang, Tao Xu, Hongsheng Li, Shaoting Zhang, Xiao-gang Wang, Xiaolei Huang, and Dimitris N Metaxas. Stack-gan: Text to photo-realistic image synthesis with stacked generative adversarial networks. In Proceedings of the IEEE international conference on computer vision, pages 5907-5915, 2017.

[25] Jun-Yan Zhu, Taesung Park, Phillip Isola, and Alexei A Efros. Unpaired image-to-image translation using cycle-consistent adversarial networks. In Proceedings of the IEEE international conference on computer vision, pages 2223-2232, 2017.

[26] Peihao Zhu, Rameen Abdal, Yipeng Qin, John Femiani, and Peter Wonka. Improved stylegan embedding: Where are the good latents? arXiv preprint arXiv:2012.09036, 2020.

What is claimed is:

1. A method to disentangle a target entangled semantic attribute editing direction of a plurality of semantic attribute editing directions learned from a first latent space of a generative adversarial network (GAN) model, the target entangled semantic attribute editing direction learned for generating edited images in relation to a target semantic attribute, the method comprising:
  re-learning the target entangled semantic attribute editing direction from a merged latent space for the target semantic attribute, the merged latent space comprising self-corrected latent code samples generated from interpolations along the target entangled semantic attribute editing direction to obtain edited image samples having localized changes corresponding to the target semantic attribute, and wherein the target semantic attribute comprises a minority attribute in a training dataset used to obtain the first latent space.

2. The method of claim 1, wherein:
the GAN model maps latent codes z from a known distribution $Z \subseteq R^d$ to an image space $X \subseteq R^{H \times W \times 3}$ with a mapping function g: $Z \to X$; and
the first latent space comprises an intermediate latent space $W \subseteq R^d$ such that the edited images are controlled by a function of w=M(z) where M is a multilayer perceptron network, w latent code samples lies in the intermediate latent space W and each w latent code sample is repeated to a provide a w+ latent code sample and fed to generator layers of a generator G of the GAN model at different resolutions to generate the edited images in accordance with G(w+).

3. A method to disentangle a target entangled semantic attribute editing direction of a plurality of semantic attribute editing directions, each of the semantic attribute editing directions learned from a first latent space of a generative adversarial network (GAN) model for generating edited images and the target entangled semantic attribute editing direction learned for generating edited images in relation to a target semantic attribute, the method comprising:
generating self-corrected latent code samples, each self-corrected latent code sample generated by interpolating a latent code sample from the first latent space along the target entangled editing direction to obtain an edited image sample having localized changes corresponding to the target semantic attribute, wherein the target semantic attribute comprises a minority attribute as represented in the first latent space;
using the self-corrected latent code samples to define a merged latent space for re-learning the target entangled semantic attribute editing direction for the target semantic attribute; and
re-learning the target entangled semantic attribute editing direction using the merged latent space.

4. The method of claim 3, wherein the first latent space comprises an intermediate latent space determined for controlling the generation of the edited images using at least some of the plurality of editing directions.

5. The method of claim 4, wherein the GAN model comprises a model defined in accordance with a StyleGAN technique and the intermediate latent space comprises a W space in accordance with the StyleGAN technique for generating the edited images.

6. The method of claim 3 comprising inverting each edited image sample to determine the self-corrected latent code samples in space W.

7. The method of claim 3 comprising learning the plurality of semantic attribute editing directions including the target semantic attribute editing direction.

8. The method of claim 3, wherein the training dataset comprises images in which the minority attribute is present with a second attribute such that minority attribute and second attribute are entangled in the first latent space.

9. The method of claim 3 wherein the at least a first re-learned semantic attribute editing direction, the first semantic attribute editing direction and the second semantic attribute editing direction all comprise one of i) state vector machine-based (SVM-based) editing directions or ii) gradient based editing directions.

10. An apparatus comprising:
a generative adversarial network (GAN) model comprising at least a first re-learned semantic attribute editing direction in which a first semantic attribute editing direction associated with a first semantic attribute is disentangled from a second semantic attribute editing direction associated with a second semantic attribute, the first semantic attribute editing direction re-learned using a merged latent space comprising self-corrected latent code samples, the self-corrected latent code samples generated to balance a data distribution representing the first semantic attribute; and
an interface to operate the GAN model to generate edited images using the at least the first re-learned editing direction.

11. The apparatus of claim 10, wherein:
the self-corrected latent code samples are generated from interpolations along the first editing direction as entangled to obtain edited image samples with localized changes corresponding to a minority attribute as represented in a first latent space from which the first editing direction is first learned.

12. The apparatus of claim 11, wherein the at least a first re-learned semantic attribute editing direction, the first semantic attribute editing direction and the second semantic attribute editing direction all comprise one of i) state vector machine-based (SVM-based) editing directions or ii) gradient-based editing directions.

13. The apparatus of claim 10, wherein:
the interface to operate the GAN model is configured to receive an input image for generating an output image, the output image edited along one or more of a plurality of editing directions, the plurality of editing directions comprising the at least the first-relearned editing direction.

14. The apparatus of claim 13 comprising a user interface to receive the input image and present the output image.

15. The apparatus of claim 13 comprising an effects simulation engine for applying one or more effects to either or both of the input image to the GAN model or the output image of the GAN model.

16. The apparatus of claim 15 wherein:
the simulation engine comprises a virtual try on (VTO) engine that simulates an effect of a product or service; and
the apparatus comprises one or both of i) an e-commerce interface to purchase the product or service; and ii) a recommendation engine to recommend the product or service.

17. The apparatus of claim 16, wherein the product comprises a beauty product.

18. A computing device comprising circuitry configured to provide a virtual try on (VTO) experience, the circuitry configured to provide:
an editing interface to a generative adversarial network (GAN) model having a plurality of semantic attribute editing directions configured to edit semantic attributes in an input image to produce an edited output image, the plurality including a first semantic attribute editing direction, associated with a first attribute, that is disentangled from a second semantic attribute editing direction, the first semantic attribute editing direction disentangled through re-learning the first semantic attribute editing direction using a merged latent space comprising i) self-corrected latent codes generated to balance a distribution of latent codes associated with the first semantic attribute in the merged latent space and ii) uncorrected latent codes associated with the first semantic attribute used to learn the first semantic attribute editing direction as entangled;

an effects interface to an effects engine configured to simulate an effect to either the input image or the edited output image from the GAN model, the effect associated with a product, a service, or both a product and service; and an e-commerce interface with which to purchase products, services or both products and services that are available for simulation through the VTO experience.

19. The computing device of claim 18, wherein the product comprises any of a make-up product; a hair coloring product; a nail coloring product; or a skin, hair or nail treatment product.

* * * * *